2,845,452

TETRA-ACETYL MUCIC ACID AMIDES

Charles J. Morel, Arlesheim, Basel Land, Switzerland, assignor to J. R. Geigy A.-G., Basel, Switzerland, a Swiss firm No Drawing. Application April 9, 1956
Serial No. 576,827

Claims priority, application Switzerland April 27, 1955

3 Claims. (Cl. 260—490)

The present invention is concerned with new derivatives of mucic acid which have valuable pharmacological properties.

Diamides of tetra-acetyl mucic acid of the general formula:

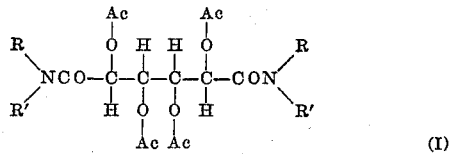

(I)

wherein R represents a lower alkyl radical, R' represents a lower alkyl radical, and Ac is an abbreviation for the acetyl radical $CH_3-CO-$, have not been known up to now.

It has now been found that such compounds have a strong antiphlogistic action. They can be used, e. g. for the treatment of thrombophlebitis, in particular when followed by ulcus cruris, of polyradiculitis acuta and of dermatosis caused by light. They are administered per os, e. g. in the form of tablets, in a quantity of 2–5 g. per day.

The new mucic acid derivatives defined above can be produced in a simple manner by reacting 1 mol of tetra-acetyl mucic acid dihalide of the general formula:

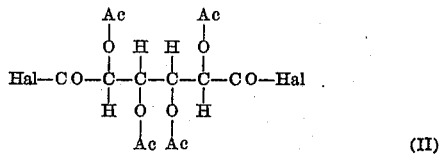

(II)

wherein Hal represents chlorine or bromine, with 2 mols of amines of the general formula:

(III)

wherein R and R' have the meanings given above, the reaction being performed in the presence of an acid binding agent. For example, an excess of the amine used can be the acid binding agent and the reaction can be performed in a suitable inert organic solvent or diluent, e. g. in benzene, in the warm. Examples of amines of the general Formula III are: methylamine, ethylamine, n-propylamine, isopropylamine, n-butylamine, sec. butylamine, isobutylamine, n-amylamine, isoamylamine, allylamine, methallylamine, dimethylamine, diethylamine, di-n-propylamine, di-n-butylamine, di-isobutylamine, diallylamine, dimethallylamine, methyl-ethylamine, methyl-n-propylamine, methyl-isopropylamine, methyl-n-butylamine, methyl-isobutylamine, methyl-amylamine, methyl-isoamylamine, methyl-allylamine, methyl-methylallylamine, and ethyl-allylamine.

Tetra-acetyl mucic acid dichloride can be obtained from tetra-acetyl mucic acid (Skraup, Monatshefte für Chemie 14, 488) for example by means of phosphorus pentachloride (Diels, Löflund, Berichte der deutschen chem. Gesellschaft 47, 2352 [1914] or by means of thionyl chloride (J. Müller, Berichte der deutschen chem. Gesellschaft 47, 2655).

The following examples serve to illustrate the production of new compounds. Parts are given as parts by weight unless otherwise indicated and their relationship to parts by volume is as that of grams to cubic centimeters. The temperatures are in degrees centigrade.

Example 1

13.5 parts of tetra-acetyl mucic acid dichloride are suspended in 200 parts by volume of abs. benzene and, while stirring and cooling with water, 11 parts of diethylamine in 50 parts by volume of abs. benzene are added dropwise at 30–35°. On completion of the dropwise addition, the whole is boiled under reflux for 2 hours. After cooling, about 100 parts by volume of 2 N-hydrochloric acid are added and the precipitated tetra-acetyl mucic acid-bis-diethylamide is filtered off under suction. This is then washed with saturated aqueous bicarbonate solution and water. Recrystallised from ethyl acetate, it melts at 194–195°.

Example 2

13.5 parts of tetra-acetyl mucic acid dichloride in 200 parts by volume of abs. benzene are reacted as described above with 18 parts of di-n-butylamine. After cooling, the benzene solution in the separating funnel is washed with 2 N-hydrochloric acid, saturated bicarbonate solution and water. After drying with sodium sulphate, the benzene is distilled off and the residue is recrystallised from ethyl acetate. M. P. 162–163°.

The following compounds of the general formula I for example, are obtained in an analogous manner:

| R | R' | recrystallised from— | M. P., degrees |
|---|---|---|---|
| $CH_3-CH_2-CH_2-$ | $CH_3-CH_2-CH_2-$ | ethanol | 229–230 |
|  |  | ethyl acetate | 188–189 |
| $CH_3 \atop CH_3 ^{\diagdown} CH-CH_2-$ | $CH_3 \atop CH_3 ^{\diagdown} CH-CH_2-$ | methanol | 168–169 |
| $CH_2 \atop CH_3 ^{\diagdown} C-CH_2-$ | $CH_2 \atop CH_3 ^{\diagdown} C-CH_2-$ | ethanol | 170–171 |
| $CH_3-$ | $n-C_4H_9$ | ether/petroleum ether (about 1:1) | 111–112 |

What I claim is:

1. A tetra-acetyl mucic acid diamide corresponding to the formula:

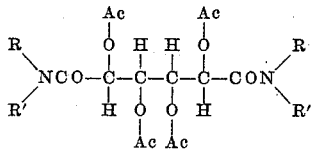

wherein R represents a lower alkyl radical, R' represents a lower alkyl radical, and Ac represents the acetyl radical $CH_3-CO-$.

2. A tetra-acetyl mucic acid diamide corresponding to the formula:

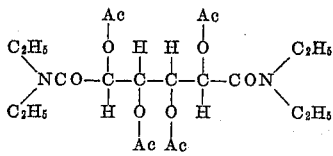

wherein Ac represents the acetyl radical $CH_3-CO-$.

3. A tetra-acetyl mucic acid diamide corresponding to the formula
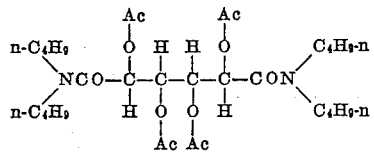
wherein Ac represents the acetyl radical $CH_3-CO-$.
References Cited in the file of this patent
UNITED STATES PATENTS
2,084,626    Tabern _____ June 22, 1937
OTHER REFERENCES
Muller: Ber. Deut. Chem. 47 (1914), pp. 2654–6.
Diels et al.: Ber. Deut. Chem. 47 (1914), p. 2353.